United States Patent [19]
Pierce et al.

[11] Patent Number: 5,460,076
[45] Date of Patent: Oct. 24, 1995

[54] FLUID-OPERATED BRAKE ACTUATOR WITH INTERNAL CHECK VALVE

[75] Inventors: Wiliam C. Pierce, Muskegon; John P. Smith, Grand Rapids; Steven Stojic, Holland, all of Mich.

[73] Assignee: NAI Anchorlok, Inc., Muskegon, Mich.

[21] Appl. No.: 213,441

[22] Filed: Mar. 15, 1994

Related U.S. Application Data

[63] Continuation-in-part of Ser. No. 54,757, Apr. 27, 1993, Pat. No. 5,372,059.

[51] Int. Cl.[6] .............................. F01B 19/00; F15B 9/10
[52] U.S. Cl. ........................ 92/48; 92/98 R; 92/181 P; 91/376 R; 137/517
[58] Field of Search ............................ 92/48, 49, 181 R, 92/181 P, 183, 184, 98 R, 99; 91/376 R; 137/517, 542

[56] References Cited

U.S. PATENT DOCUMENTS

| | | |
|---|---|---|
| 2,918,878 | 12/1959 | Zieg et al. ........................ 92/48 X |
| 2,931,616 | 4/1960 | White et al. . |
| 3,101,219 | 8/1963 | Herrera . |
| 3,155,012 | 11/1964 | Ayers, Jr. . |
| 3,659,501 | 5/1972 | Beard . |
| 3,696,711 | 10/1972 | Berg et al. . |
| 3,712,178 | 6/1973 | Hensley . |
| 3,730,056 | 5/1973 | Swander, Jr. . |
| 3,886,968 | 6/1975 | Murrell ........................ 137/501 |
| 3,908,520 | 9/1975 | Ma ........................ 92/99 X |
| 3,991,659 | 11/1976 | Robinson ........................ 137/517 X |
| 4,509,409 | 4/1985 | Reeves ........................ 92/181 P X |
| 4,594,058 | 6/1986 | Fischell ........................ 92/99 X |
| 4,960,036 | 10/1990 | Gummer et al. . |
| 5,320,135 | 6/1994 | Pierrov ........................ 137/517 X |

FOREIGN PATENT DOCUMENTS

| | | |
|---|---|---|
| 531795 | 10/1956 | Canada . |
| 513774 | 2/1955 | Italy . |
| 53-7809 | 1/1978 | Japan . |

*Primary Examiner*—Edward K. Look
*Assistant Examiner*—Hoang Nguyen
*Attorney, Agent, or Firm*—Varnum, Riddering, Schmidt & Howlett

[57] ABSTRACT

A fluid-operated brake actuator having a check valve in the spring chamber to equalize the pressure on opposite sides of an operating movable diaphragm. The brake actuator comprises a service brake housing divided into first and second service chambers by a diaphragm or piston, and a spring brake housing arranged in tandem with and attached to the service brake housing, also divided into a first and second spring chambers by a diaphragm or piston. The check valve connecting the first and second spring chambers blocks flow between the first and second chambers when the second spring brake chamber is pressurized and opens up flow between the two chambers when the second spring chamber is depressurized.

27 Claims, 13 Drawing Sheets

FLUID-OPERATED BRAKE ACTUATOR WITH INTERNAL CHECK VALVE

This application is a continuation-in-part of application Ser. No. 08/054,757, filed 04/27/93, now U.S. Pat. No. 5,372,059, issued on Dec. 12, 1994.

BACKGROUND OF THE INVENTION

1. Field of the Invention

The invention relates to fluid-operated brake actuators for vehicles and more particularly to a fluid-operated actuator with a check valve for regulating fluid flow within the fluid-operated brake actuator.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a large-force compression spring that applies the brake when the air is released. This is often referred to as the spring brake. Typically, the spring brake actuator is disposed in tandem with the service brake actuator.

The spring brake actuator is typically divided into two chambers separated by a diaphragm and pressure plate, with the spring in one of the chambers acting between an end wall of the spring brake housing and the pressure plate. When full air pressure is applied to the opposite chamber, air pressure acting against the diaphragm and pressure plate compresses the spring. In many applications, a spring brake actuator rod is held in a retracted position by a relatively small return spring. In newer applications, the spring brake actuator rod is integral with the pressure plate and held in a retracted position by the air pressure.

In both designs, the spring brake actuator rod does not affect the normal operation of the brake. The service chamber is typically divided into two chambers by a diaphragm. Depressing the brake pedal during normal driving operation introduces compressed air into one of the chambers of the service brake actuator which, acting against the diaphragm, causes a service brake push rod on the other side of the diaphragm to be extended and the brakes to be applied with an application force proportional to the air pressure in the service brake actuator.

In the event of a loss of air pressure or an intentional exhaustion of air from the spring brake actuator, the brake will be mechanically activated by the force of the large-force compression spring acting on the spring brake actuator rod which, in turn, acts upon the service brake push rod to apply the brakes. Thus, the spring brake portion serves both as a parking brake and as an emergency brake.

In tandem actuator assemblies, the spring brake push rod typically extends from a chamber in the spring brake portion, through an aperture in a wall separating the spring brake actuator from the service brake actuator, and into a chamber in the service brake portion. Because at least one of the adjoining chambers is usually pressurized, an O-ring seal is provided at the aperture around the push rod.

When air pressure is released from the spring brake actuator, the spring and diaphragm extend significantly, expanding the volume of the spring brake actuator chamber containing the spring. As the volume of the spring brake actuator chamber increases, air must enter the expanded volume of the chamber to prevent a vacuum from forming in the spring brake actuator chamber and thereby retard the application of the spring brake. When the spring is retracted, the volume of the chamber contracts and air must be evacuated from the chamber. In many prior brake actuators, the chamber containing the spring is simply open to atmosphere through ports in the chamber housing. However, an open chamber allows dirt, salt, moisture and other unwanted material to enter that chamber through the ports. With the advent of hollow actuator rods containing caging tools, the presence of foreign material within the actuator rod has become an increasing concern of brake designers.

Some prior designs have attempted to address the problem of reducing or eliminating the vacuum in the spring brake actuator chamber by providing a breather tube between the push rod chamber of the service brake actuator and the spring chamber of the spring brake actuator, as in the U.S. Pat. No. 4,960,036 to Gummer et al. In this design, the push rod chamber of the service brake actuator must be vented to atmosphere for normal application of the brakes. Venting of the push rod chamber occurs either through a separate vent, or through the external opening carrying the push rod. Thus, the spring chamber of the spring brake actuator remains open to atmosphere, and is still exposed to moisture, dirt and grime, albeit through a longer passage than a fully vented spring chamber. This longer passage may also prevent the spring chamber from drying as effectively as a sealed or more fully vented spring chamber.

SUMMARY OF THE INVENTION

The invention relates to a vehicle brake actuator having a housing divided into a first chamber and a second chamber by a movable member disposed within the housing. The movable member reciprocally moves within the housing in response to the delivery and exhaust of pressurized fluid to and from the first chamber. An actuator rod is operably connected to the movable member and moves therewith for operation of a brake. A spring is disposed in the second chamber in a position to urge the movable member to the first position when the first chamber is exhausted of pressurized fluid. The movable member has an aperture extending through the movable member so that the first chamber is in communication with the second chamber. A check valve is mounted to the movable member in a position to control the flow of fluid through the aperture depending on the magnitude and direction of differential pressure created during various braking actions. Preferably, fluid flow through the aperture is permitted by the check valve as the movable member moves toward the first position and fluid flow through the aperture is inhibited by the valve as the movable member moves away from the first position.

In another aspect of the invention, the brake actuator has a housing comprising a spring brake actuator and a service brake actuator. The spring brake actuator housing is divided into a first spring brake actuator chamber and a second spring brake actuator chamber by a movable member disposed within the housing of the spring brake actuator. The movable member moves reciprocally within the spring brake actuator housing in response to the delivery and exhaust of pressurized fluid to the second spring brake actuator chamber. The service brake housing is divided into a first service brake actuator chamber and a second service brake actuator chamber by a second movable member mounted for reciprocal movement within the service brake actuator housing in response to the delivery and exhaust of pressurized fluid to the first service brake actuator chamber. An actuator rod is operably connected to the first movable member and movable therewith for reciprocation between the spring brake actuator housing and the service brake actuator housing for operation of a brake. A spring is disposed in the first spring brake actuator chamber in a position to urge the movable member to a first position when the second spring brake actuator chamber is collapsed by the exhaust of pressurized fluid from the second spring brake actuator chamber. The first movable member has an aperture extending therethrough to establish communication between the first spring brake actuator chamber and the second spring brake actuator chamber. A check valve is mounted to the movable member in a position to control the flow of fluid through the aperture so that fluid flow is permitted by the check valve as the movable member moves toward the first position and fluid flow is blocked by the check valve as the movable member moves away from the first position.

In one other aspect of the invention, the vehicle brake actuator comprises a housing divided into a first chamber and a second chamber by a dividing means disposed within the housing. The dividing means is reciprocally movable within the housing in response to the delivery and exhaust of pressurized fluid to the first chamber. An actuating means is operably connected to the dividing means and movable therewith to actuate a brake. A biasing means is disposed in the second chamber to urge the dividing means to a first position so the first chamber is collapsed upon exhaustion of pressurized fluid from the first chamber. The dividing means has an aperture extending therethrough so that the first chamber is in communication with the second chamber. A fluid flow control means is mounted to the dividing means in a position to control the flow of fluid through the aperture so that the fluid flow is permitted by the fluid flow control means as the dividing means moves towards the first position and fluid flow is inhibited by the fluid flow control means as the dividing means moves away from the first position.

DETAILED DESCRIPTION OF THE DRAWINGS

Figure 1:
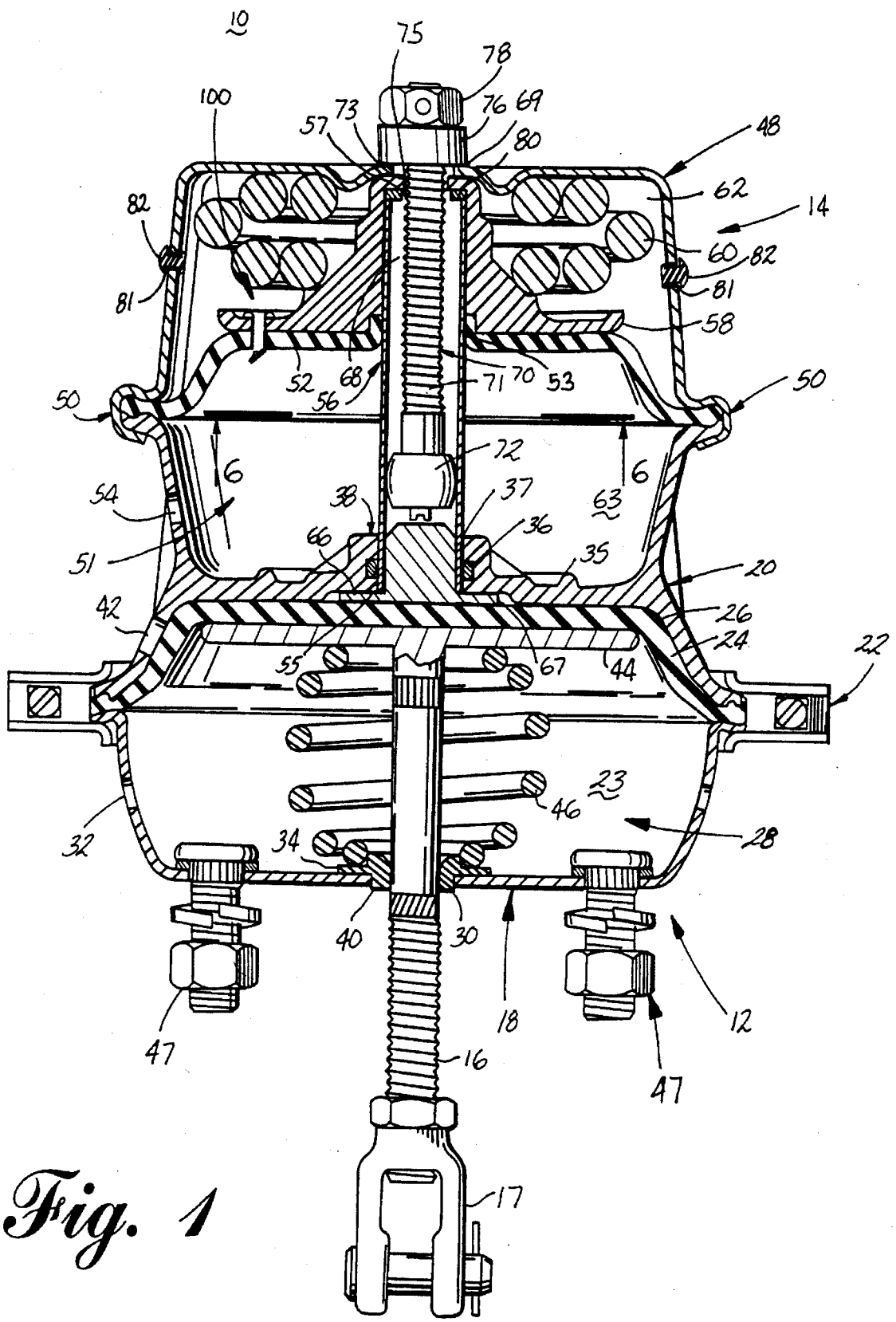
FIG. 1 is a cross-sectional view of a fluid-operated brake actuator having a check valve according to the invention and showing the second spring brake chamber fully pressurized.

FIG. 1 illustrates a fluid-operated brake actuator 10 having a general configuration well known in the art. The fluid-operated brake actuator 10 comprises a service brake actuator 12 mounted in tandem to a spring brake actuator or emergency brake actuator 14. Although the invention is illustrated with respect to a fluid-operated spring brake having a tandem construction, the invention can be used in any type of brake, including non-tandem, fluid-operated spring brakes in which the spring chamber is separated from the service chamber.

A service brake push rod 16 extends from the service brake actuator 12 for reciprocating movement between a retracted position and an extended actuating position relative to the service brake actuator 12, and has a clevis 17 adapted to connect to a conventional brake shoe and drum (not shown) in a standard fashion. Reciprocating motion of the service brake push rod 16 provides activating means for alternately applying and releasing the brake.

The service brake actuator 12 has a housing defined by a cup-shaped service housing section 18 and a double cup-shaped adapter housing 20 joined together by a clamp 22 to form a service brake chamber 23. The adapter housing 20 is also sometimes known as a flange case.

The service brake chamber 23 is divided into two sections by a dividing means. Preferably, the dividing means is a first elastomeric diaphragm 24 (also known as the service brake diaphragm) suspended within the service brake chamber 23, the peripheral edge thereof secured in fluid tight enclosure between the cup-shaped service housing section 18 and the service side of the adapter housing 20 by the clamp 22.

Figure 3:
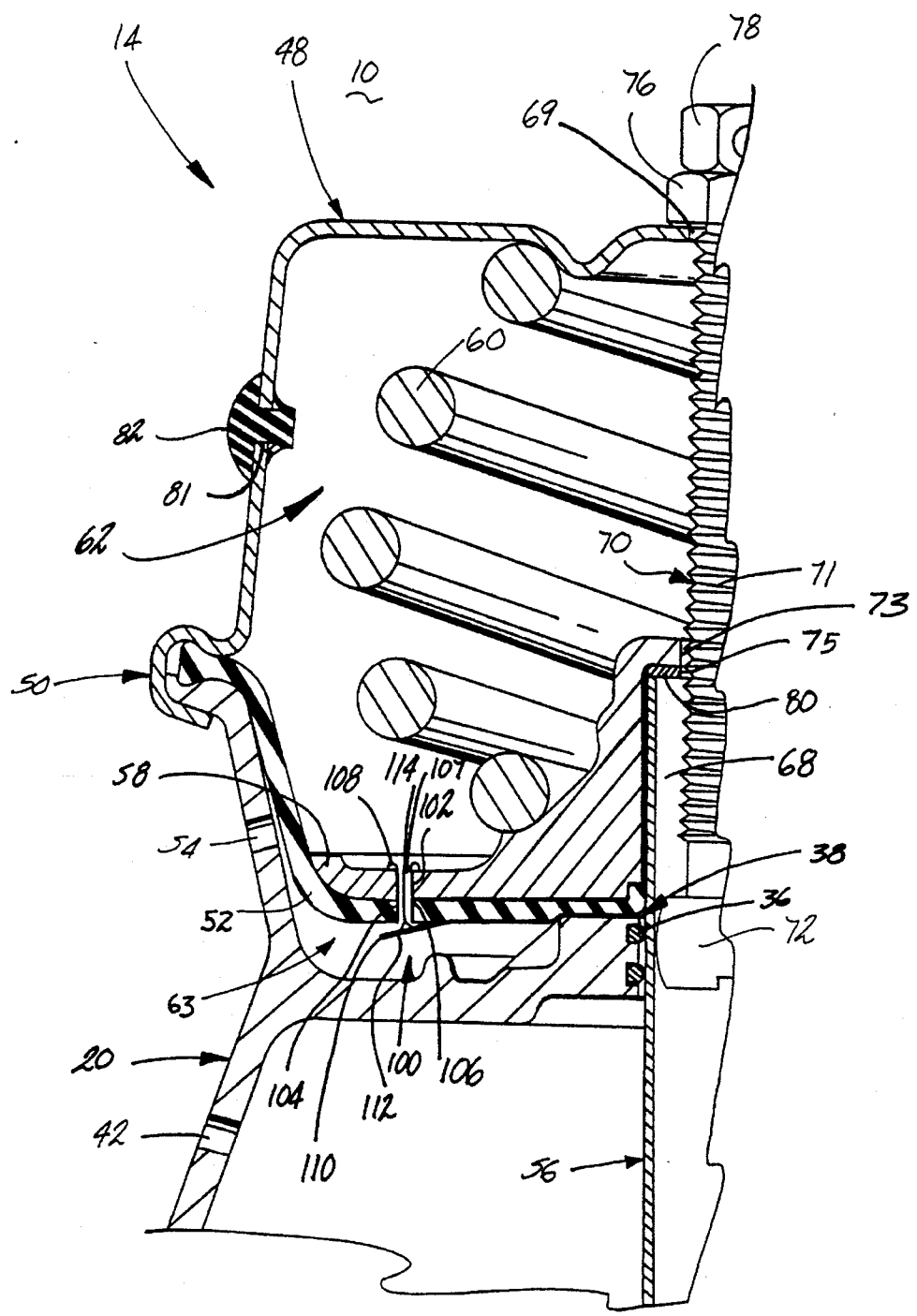
FIG. 3 is a view like FIG. 2 showing the fluid-operated brake actuator but with the second spring brake chamber unpressurized.
Figure 4:
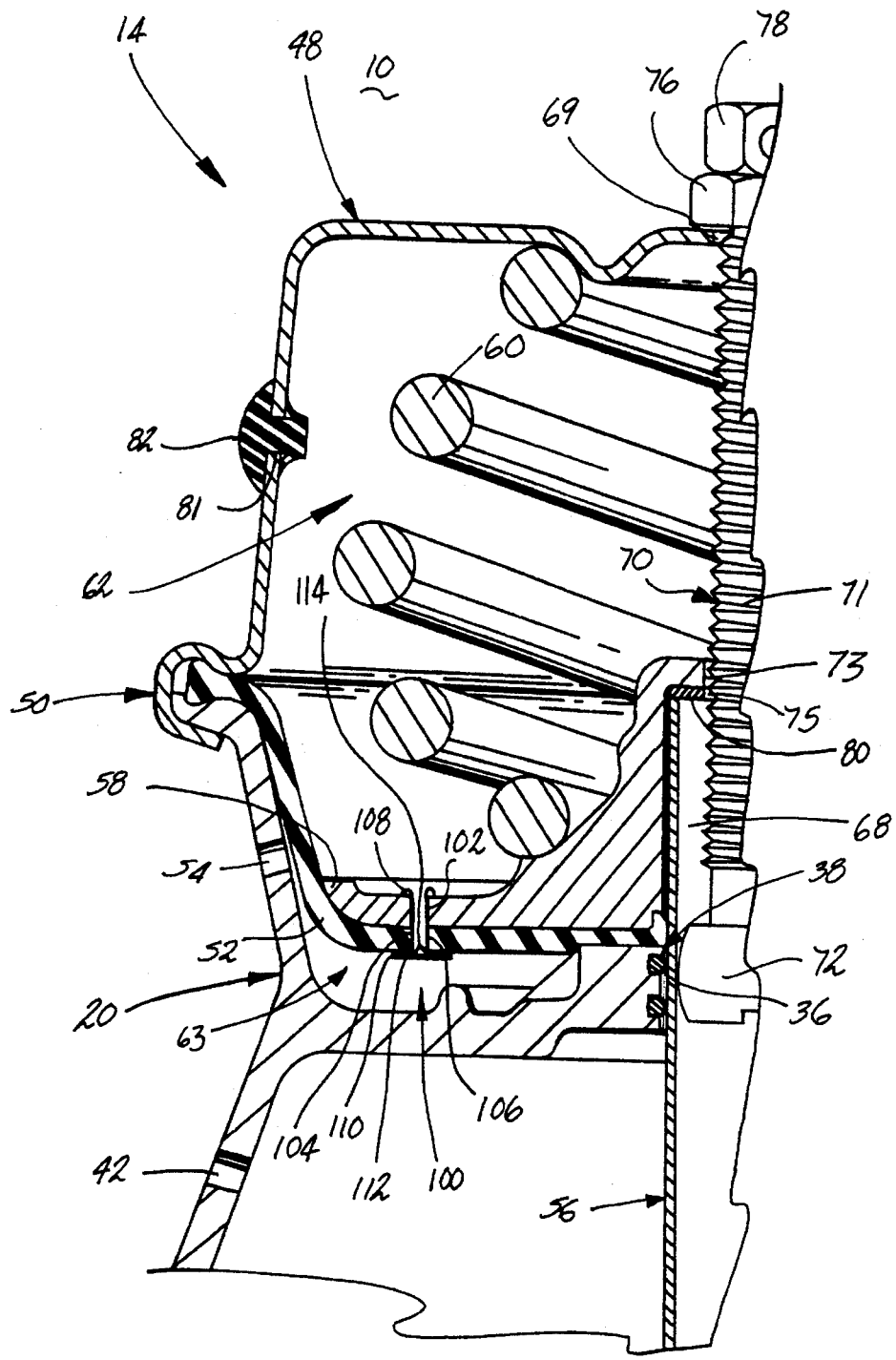
FIG. 4 is a view like FIG. 3 showing the fluid-operated brake actuator at initiation of pressurization of the second spring brake chamber.
Figure 5:
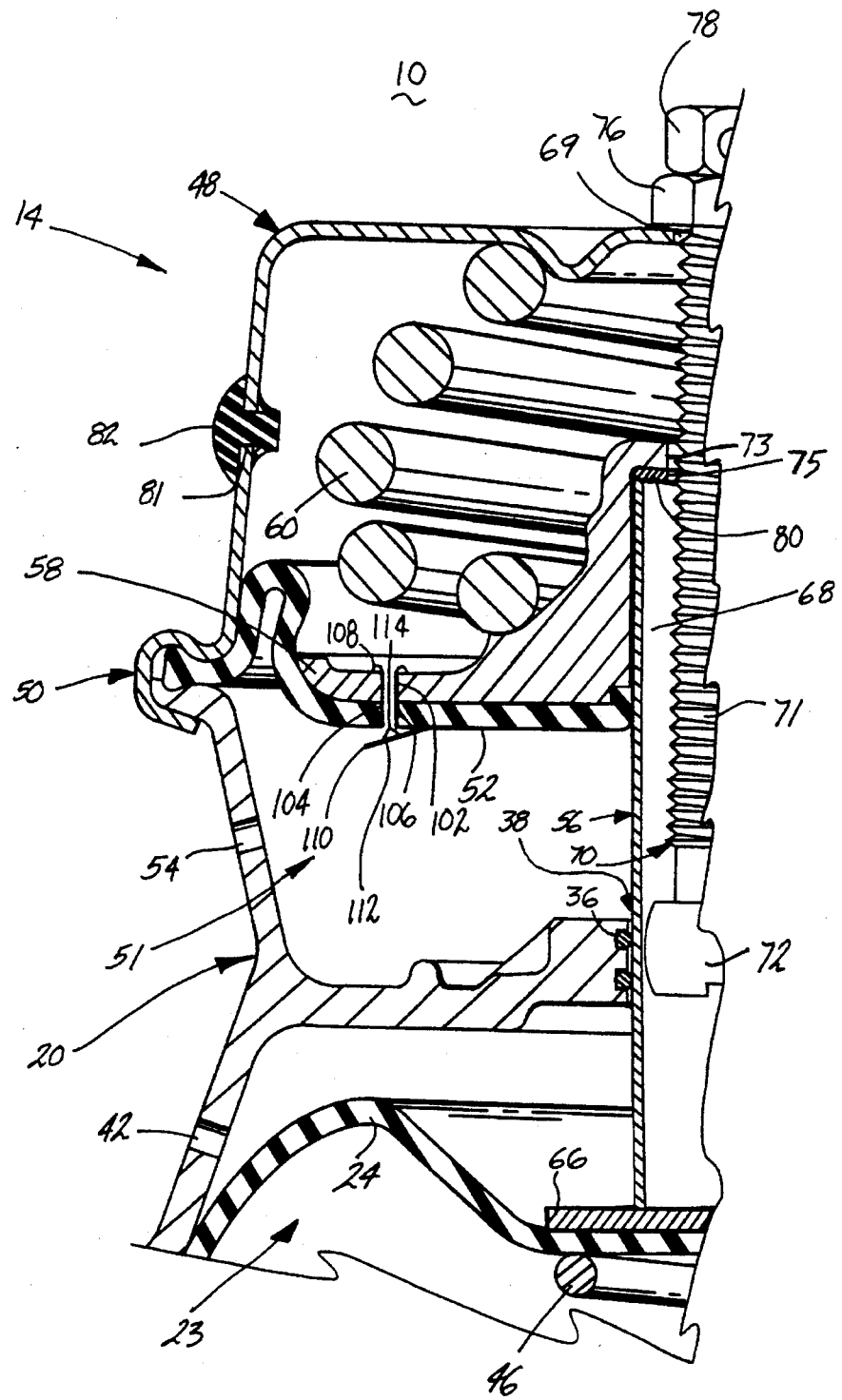
FIG. 5 is a view like FIG. 4 showing the fluid-operated brake actuator with the pressurized fluid in the second spring brake chamber partially exhausted.

The first elastomeric diaphragm 24 separates the service brake chamber 23 into two portions: a first service chamber portion 26 and a second service chamber portion 28. The first service chamber portion 26 communicates with a source of pressurized air (not shown) through an air service port 42 in the adapter housing 20. The second service chamber portion 28 is vented to the atmosphere through at least one opening 32 in the cup-shaped service housing section 18. In FIG. 1, the first service chamber portion 26 is shown evacuated so that the first elastomeric diaphragm 24 is forced against the adapter housing 20 because of the force from compression spring 46 in the second service chamber portion 28. FIGS. 3, 4 and 5 illustrate the first service chamber portion partially or fully pressurized.

The service brake push rod 16 extends through a central opening 30 in the cup-shaped service housing section 18 and has a pressure plate 44 at the end thereof within the second service chamber portion 28. The pressure plate 44 bears against the first elastomeric diaphragm 24. A compression spring 46 extends between the pressure plate 44 and the interior surface of the cup-shaped service housing section 18. A push rod guide 34 having an annular seat 40 is disposed within the central opening 30 to guide reciprocal movement of the service brake push rod 16 within the central opening 30 and also to receive the end of the compression spring 46 and retain it in position around the central opening 30. The compression spring 46 urges the pressure plate 44 and the service brake push rod 16 to a fully retracted position as depicted in FIG. 1.

To operate the service brake actuator 12, compressed air is introduced through the air service port 42 into the first service chamber portion 26 to create a force against the first elastomeric diaphragm 24 and pressure plate 44 sufficient to overcome the force of the compression spring 46, thereby extending the service brake push rod 16 toward the actuating position. The openings 32 permit rapid evacuation of air from the second service chamber section 23 as the service brake is actuated. Mounting studs 47 are provided to mount the fluid-operated brake actuator 10 onto a vehicle (not shown).

The spring actuator or emergency brake actuator 14 has a housing defined by the spring side of the adapter housing 20 and a generally cylindrical head or spring chamber 48, which is clamped to the spring side of the adapter housing 20 by a clamp 50 to form the spring brake chamber 51. The spring brake actuator is divided into two portions, preferably by dividing means such as a second elastomeric diaphragm 52, known as the spring diaphragm, that is suspended within the spring brake chamber 51. The peripheral edge of the spring brake diaphragm 52 is secured in fluid tight enclosure between the cylindrical head 48 and the spring side of the adapter housing 20 by the clamp 50. The second elastomeric diaphragm 52 divides the spring brake chamber 51 into two portions: a first spring chamber portion 62 and a second spring chamber portion 63. The second spring chamber portion 63 is filled with pressurized air supplied through an air service port 54 in the adapter housing 20 when the emergency brake is in its normal released position as depicted in FIG. 1.

The adapter housing 20 includes a divider wall 35 that separates the adjoining service brake chamber 23 and spring brake chamber 51. A spring brake actuator rod 56, aligned with the service brake push rod 16, has one end extending from the spring brake chamber 51 through a central opening 37 in divider wall 35 for reciprocating motion through the central opening 37 between a retracted position and an actuating position. One or more O-ring seals 36 are provided in the central opening 37 through which the spring brake actuator rod 56 reciprocates.

A distal end 55 of the spring brake actuator rod 56 terminates in a reaction plate 66 in the first service chamber portion 26, and which is received in an annular seat 67 when the spring brake actuator rod 56 is in the retracted position as depicted in FIG. 1, an opposite, proximal end 57 of the actuator rod 56 extends through an opening 53 in the second elastomeric diaphragm 52 and terminates in a pressure plate 58 which abuts an end of a large force compression spring 60. The pressure plate 58 abuts one end of the compression spring 60.

The spring brake actuator rod 56 can be solid, but is preferably a hollow tube or rod provided with a central bore 68 to accommodate a brake release rod or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The caging tool 70 comprises a threaded elongated shaft 71, with one end having an enlarged head portion 72. The opposite end of the caging tool 70 is threaded through a head nut 76 fixedly mounted to the cylindrical head 48, and has a hex head nut 78 fixedly secured thereto.

The caging tool 70 primarily serves to enable manual retraction of the powerful compression spring 60. Rotation of the hex head nut 78, threads the shaft 71 through the head nut 76, to axially move the caging tool 70 with respect to the cylindrical head 48. The enlarged head portion 72 slides freely within the central bore 68 of the spring brake actuator rod 56, yet is restrained by an inwardly directed annular flange 80 at the actuator rod proximal end 57. Thus, withdrawal of the caging tool 70 by rotation of the hex head nut 78, causes the enlarged head portion 72 to abut the annular flange 80, and retract the pressure plate 58 and compression spring 60. For safety, the compression spring 60 is typically retracted during repairs to the brake actuator 10 and during shipping.

The cylindrical head 48 includes one or more ports 81 therein which establish communication between the first spring chamber portion 62 and the atmosphere. A one-way vent 82, installed in each port 81, controls the flow of air through the port from the first spring chamber portion 62 to the atmosphere. Preferably, the one-way vent 82 vents air to the atmosphere whenever the pressure differential between the first spring chamber 62 and the atmosphere is approximately 2 psig. The one-way vent 82 prevents the movement of air from the atmosphere into the first spring chamber 62.

In accordance with the invention, a check valve 100 extends through the dividing means 52 to fluidly connect the first and second spring chambers 62, 63. The check valve 100 has means establishing flow between the first spring brake chamber 62 and the second spring brake chamber 63 to reduce the vacuum in the first spring brake chamber 62 during application of the spring brake 14 so that the application time of the spring brake 14 is not retarded by the vacuum. In FIG. 1, it can be seen that the check valve extends through the pressure plate 58 and the spring brake diaphragm 52. However, it is within the scope of the invention for the check valve to extend through only the spring brake diaphragm 52 or pressure plate 58 depending on the configuration of the spring brake actuator 14.

A first embodiment of the check valve 100 is best seen in FIGS. 2 through 5. Although, the check valve 100 is illustrated in combination with the spring brake actuator 14, the check valve 100 is easily used in combination with the service brake actuator 12 in a similar manner as the spring brake actuator 14 as described herein. Also, the check valve 100 can be used in a piston-type brake.

The check valve 100 is mounted within aligned openings 102 and 104 of the pressure plate 58 and the spring brake diaphragm 52. The check valve 100 has a tubular portion 106, which extends through the aligned openings 102 and 104 and defines a central passage or aperture 107. A first grommet 108 secures the tubular portion 106 to the pressure plate 58 and a second grommet 110 secures the tubular portion 106 to the spring brake diaphragm 52. The second grommet 110 of the check valve 100 further comprises a biasing means, such as spring arm 112, from which extends a plug 114. The spring arm 112 is preferably made of spring steel. However, it is within the scope of the invention for the spring arm 112 to be biased separately and not made from spring steel. The plug 114 is receivable within the central passage 107 of the check valve 100 at the lower end 110 to seal the first spring chamber 62 from the second spring chamber 63. The spring arm 112 biases the plug 114 away from the check valve 100. Thus, by altering the position of the spring arm 112, the plug 114 can be moved into a sealing and non-sealing position with respect to the central passage 107. Although the biasing means is shown mounted to the second grommet 110 of the check valve 100 in the second spring chamber 63, the biasing means can be mounted in either the first or second spring chambers to any suitable place such as, but not limited to, the cylindrical head 48, adapter housing 20, second elastomeric diaphragm 52 and pressure plate 58.

By strategically opening and closing the spring arm 112 of the check valve 100 to seal and unseal the first spring chamber 62 from the second spring chamber 63, the performance of the spring brake is enhanced by the rapid exhaustion of pressurized air between the first spring chamber 62 and the second spring chamber 63. This is most important in sealed fluid-operated brakes because the first spring chamber 62 is not directly open to the atmosphere, thus reducing the brake's ability to pull air from the atmosphere to equalize the pressure within the first spring chamber as air is exhausted from the second spring chamber during application of the spring brake. A description of the brake operation will be helpful to show the advantage of the check valve.

Referring to FIG. 3, during normal operation, the vehicle parking brake is typically applied prior to the starting of the vehicle. When the parking brake is applied, air is exhausted from the second spring chamber 63 and the compression spring 60 is extended, resulting in the actuation of the service brake push rod 16 to apply the brakes. In the parking brake applied position, the spring arm 112 of the check valve 100 biases the plug 114 away from sealing contact with the tubular portion 106 and the first spring chamber 62 contains air generally between 0 and 2 psig because the vent 82 limits the air in the first spring brake chamber accordingly. Likewise, the second spring brake chamber has a similar pressure because the first and second spring brake chambers are fluidly connected by check valve 100.

Figure 2:
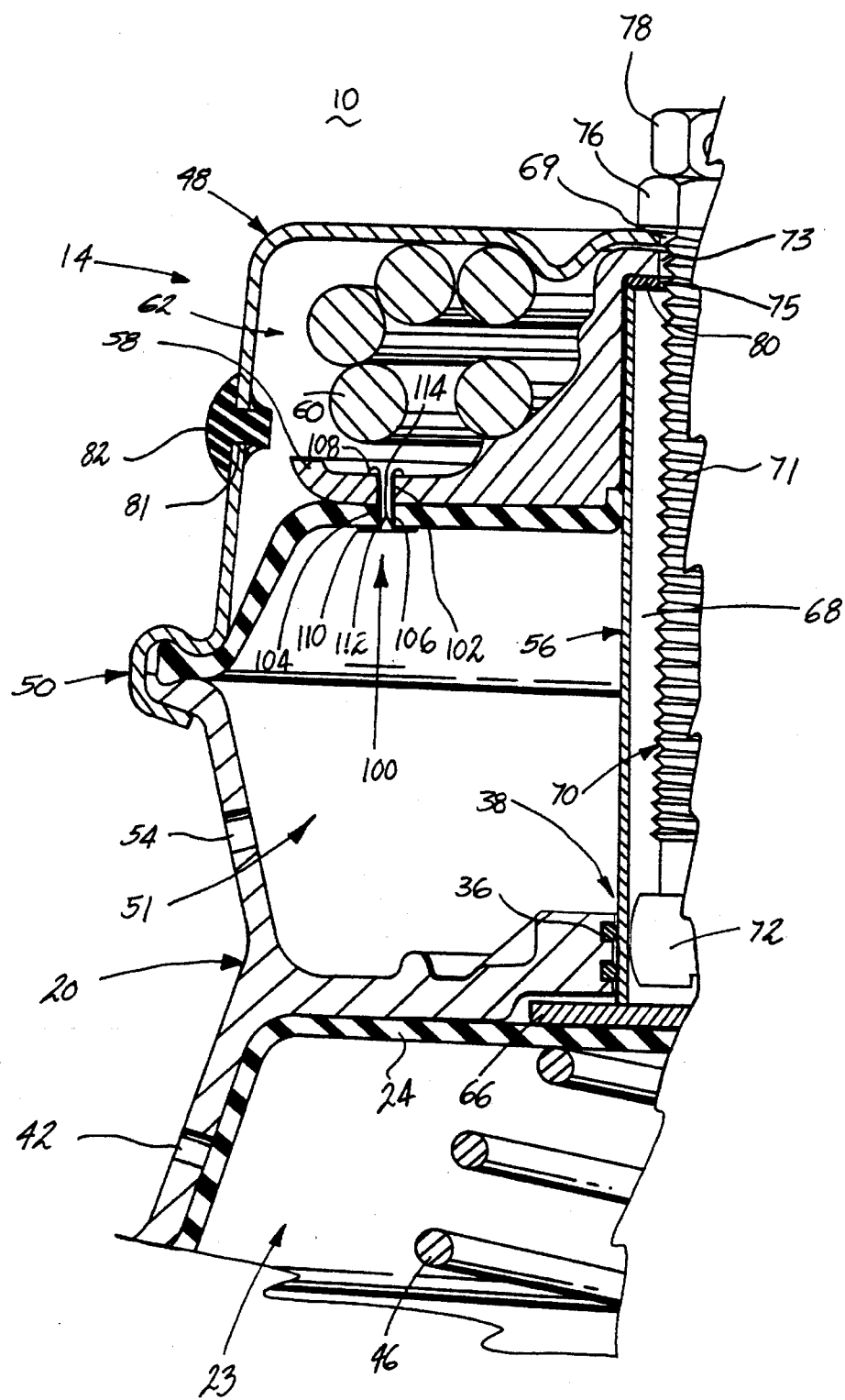
FIG. 2 is an enlarged, fragmentary cross-sectional view of a portion of the fluid-operated brake actuator of FIG. 1.

To release the parking brake, the vehicle operator pressurizes the second spring chamber 63 by directing pressurized air into the second spring chamber 63 through the air service port 54. The incoming pressurized air creates a pressure differential between the air in the first spring brake chamber 62 and the second spring brake chamber 63 because the flow rate of the incoming pressurized air is greater than the flow rate of air through the central passage 107. The force caused by the pressure differential increases until it is great enough (approximately 30 psig) to overcome the biasing force of the spring arm 112 of the check valve 100. The spring arm 112 and plug 114 are then urged toward the tubular portion 106 into the closed position in which the plug 114 is received within the central passage 107 to seal the first spring chamber 62 from the second spring chamber 63 (FIG. 4). Pressurized air is added to the second spring chamber 63 until the compression spring 60 is fully compressed and the parking brake is released as is shown in FIG. 2. In the brake release position, the plug 114 is received within the central passage 107 to seal the first and second spring chambers 62, 63 with respect to each other.

During the pressurization of the second spring chamber 63, if the air in the first spring chamber is raised above the limits of the vent 82 prior to the closing of the plug 114 from the pressure differential, the vent 82 will release the pressurized air in the first spring chamber 62 until it reaches the predetermined value of the vent 82, preferably 2 psig.

When it is desired to apply the parking brake or the emergency brake, the operator of the vehicle will exhaust the pressured air from the second spring chamber 63. As the air is exhausted from the second spring chamber 63, the compression spring 60 urges the pressure plate 58 and the spring brake diaphragm 52 downwardly, increasing the volume of the first spring chamber 62. As the volume of the first spring chamber 62 is increased, a vacuum can develop because the first spring chamber 62 is sealed with respect to the atmosphere by the one-way vents 82, which prohibit air from entering the first spring chamber 62. If a vacuum develops in the first spring chamber 62, the application time of the parking brake or emergency brake is increased because of the differential pressure on opposite sides of the diaphragm 52.

The check valve 100 reduces the vacuum in the first spring chamber 62 because as the air is exhausted from the second spring chamber 63, the force caused by the pressure differential between the second spring chamber 63 and the first spring chamber 62 is reduced below the biasing force of the spring arm 112 and the spring arm 112 and plug 114 are urged downwardly to unseal the second spring chamber 63 from the first spring chamber 62 (FIG. 5). As the first spring chamber 62 is unsealed with respect to the second spring chamber 63, a portion of the pressurized air in the second spring chamber 63 passes into the first spring chamber through the central passage 107 in the check valve 100. The addition of the pressurized air entering the first spring chamber 2 through the check valve 100 reduces or eliminates the pressure differential between the first spring chamber 62 and the second spring chamber 63, thereby reducing the application time of the parking or emergency brake. The exhaustion of air from the second spring chamber 63 is continued until the spring brake is fully applied (FIG. 3). The process is repeated for each application of the spring brake.

Figure 6:
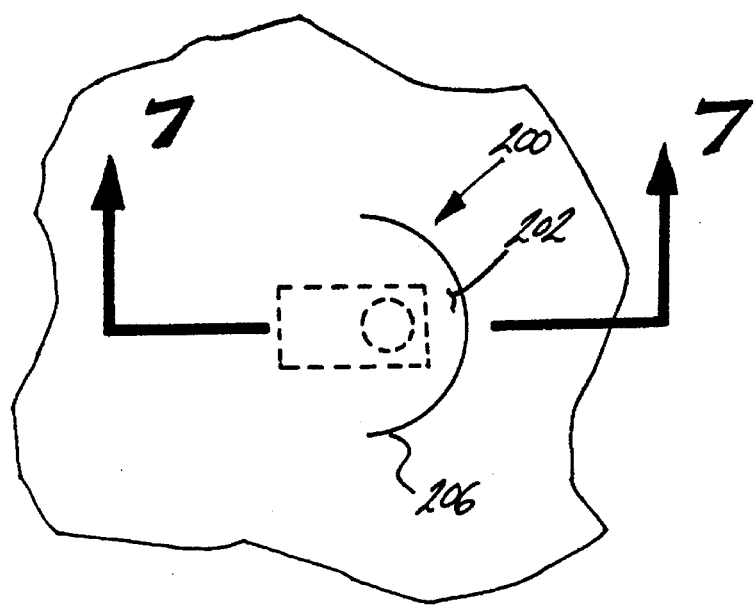
FIG. 6 is a partial plan view of the diaphragm taken along lines 6—6 of FIG. 1 but showing a second embodiment of a check valve according to the invention.
Figure 7:
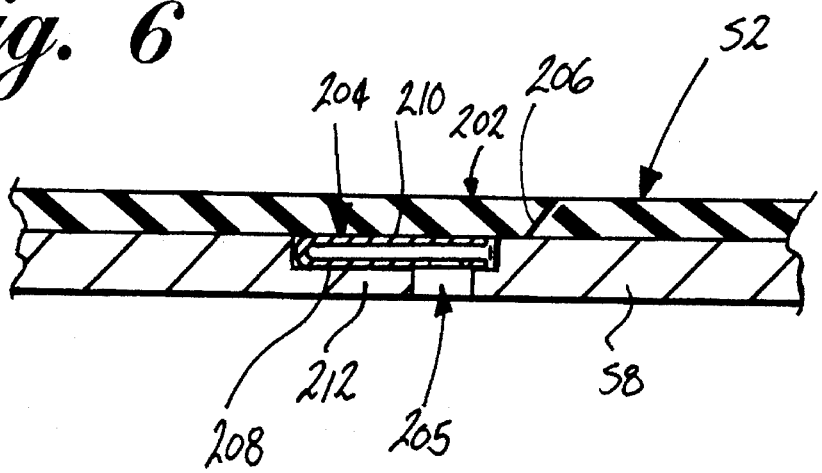
FIG. 7 is a sectional view taken along line 7—7 of FIG. 6 showing the check valve of the second embodiment in the closed position.
Figure 8:
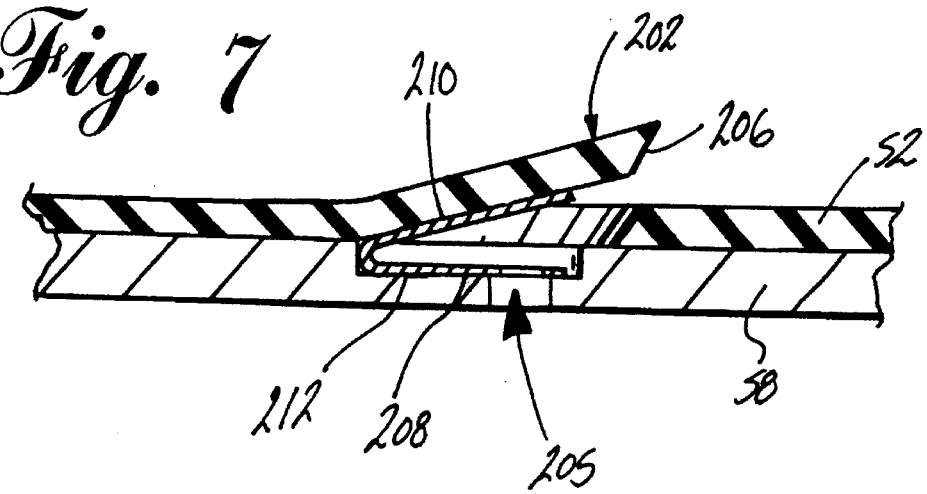
FIG. 8 is a view like FIG. 7 but showing the check valve in the open position.

FIGS. 6 through 8 illustrate a second embodiment of a check valve according to the invention wherein like numerals will be used to indicate the parts. The second embodiment of the check valve according the invention utilizes the same components for spring brake previously identified as numerals 10 through 82.

The second embodiment of the check valve is a flapper-type diaphragm valve 200, which enables the flow of fluid between the first spring brake chamber 62 and the second spring brake chamber 63 through the pressure plate 58 and the spring brake diaphragm 52. The flapper-type diaphragm valve 200 comprises a flap 202 in overlying relationship to a spring 204 within a stepped aperture 205 passing through the pressure plate 58.

The flap 202 is preferably formed by an arcuate cut 206 in the spring brake diaphragm 52. The stepped aperture 205 comprises a shelf 208 formed in the pressure plate 58. The stepped aperture 205 receives the spring 204, which rests on the shelf 208. The spring 204 is preferably a U-shaped metal spring having two arms 210 and 212. The arm 210 abuts the surface of the flap 202 facing the pressure plate 58 and the arm 212 is mounted to the shelf 208 formed in the pressure plate 58. Thus, when the valve is in the open position as disclosed in FIG. 8, the spring arm 210 moves the flap 202 formed in the spring brake diaphragm 52 away from the pressure plate 58 so that the first spring brake chamber 62 is fluidly connected to the second spring brake chamber 63 by the pressure plate aperture 205. In the closed position, as illustrated in FIG. 7, the flap 202 of the spring brake diaphragm 52 abuts the pressure plate 58 to seal the first spring chamber 62 with respect to the second spring chamber 63.

The operation of the spring brake 10 with the flapper-type diaphragm valve 200 is similar to that described above with respect to the first embodiment. When the force caused by the pressure differential between the first spring brake chamber 62 and the second spring brake chamber 63 is less than the force of the spring 204, the spring arm 210 of the spring 204 will urge the flap 202 away from the shelf 208 of the pressure plate 58 to fluidly connect the first spring chamber 62 to the second spring chamber 63. When the force caused by the pressure differential between the first spring chamber 62 and the second spring chamber 63 is greater than the spring force of the spring 204, the flap 202 is urged against the pressure plate 58 to fluidly isolate the first spring chamber 62 from the second spring chamber 63.

Figure 9:
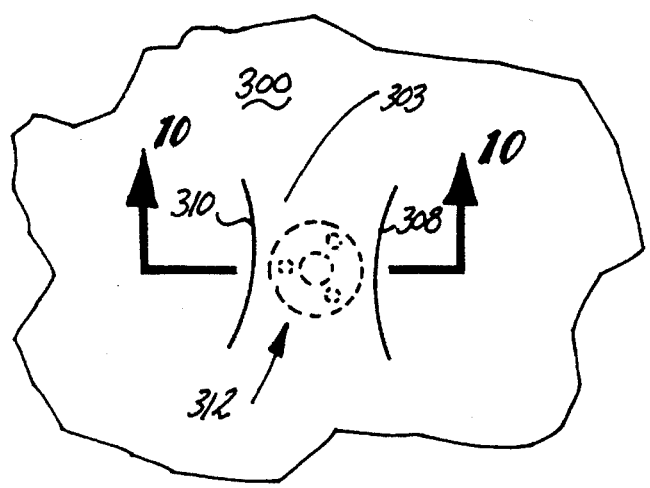
FIG. 9 is a view similar to FIG. 6 but showing a third embodiment of a check valve according to the invention.
Figure 10:
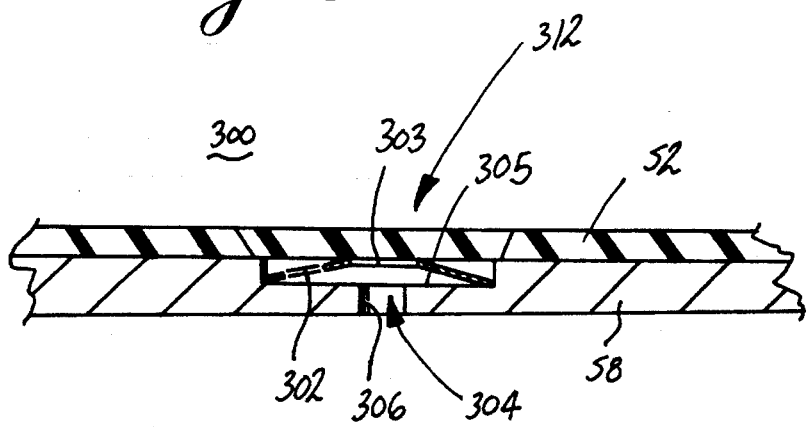
FIG. 10 is a sectional view taken along lines 10—10 of FIG. 9 showing the check valve of the third embodiment in the closed position.
Figure 11:
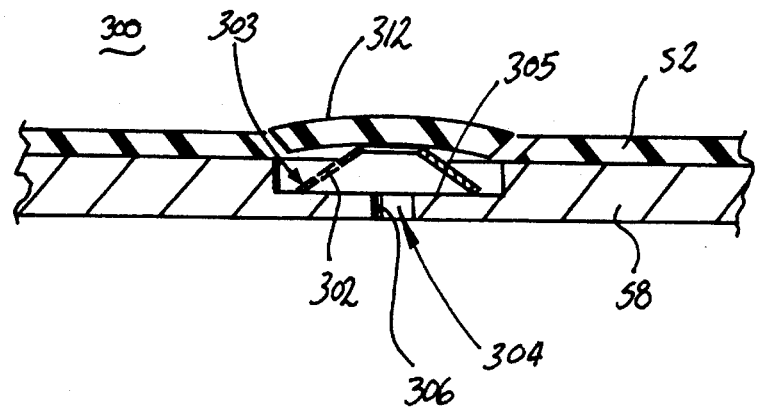
FIG. 11 is a view like FIG. 10 but showing the check valve of the third embodiment in the open position.

FIGS. 9 through 11 illustrate a third embodiment of the check valve according to the invention where like numerals are used to identify like parts. The third embodiment of the check valve according the invention utilizes the same components for the spring brake previously identified as numerals 10 through 82.

The third embodiment of the check valve comprises a diaphragm valve 300 disposed between the pressure plate 58 and the spring brake diaphragm 52. The pressure plate 58 has a recess 303 in which is disposed a disk spring 302. An aperture 304 connects the recess 303 with the first spring chamber 62. A ledge 305 is formed at the intersection of the recess 303 and the aperture 304. The disk spring 302 is disposed on the ledge 305 above the aperture 304. The curved disk spring 302 also abuts the spring brake diaphragm 52. A pair of parallel slits 308, 310 in the spring brake diaphragm 52 are diametrically disposed with respect to the curved disk spring 302 forming a flap 312 in the spring brake diaphragm 52.

The operation of the spring brake 10 with the diaphragm valve 300 is similar to the operation of the spring brake 10 with the check valve 100. When the force caused by the pressure differential between the first spring chamber 62 and the second spring chamber 63 is less that the spring force of the disk spring 302, the disk spring 302 will urge the portion of the spring brake diaphragm between the slits 308 and 310 upwardly (FIG. 11) to fluidly connect the first spring chamber 62 to the second spring chamber 63. When the force caused by the pressure differential between the first spring chamber 62 and the second spring 63 is greater than the spring force of the disk spring 302, the pressure differential will overcome the disk spring 302 and the flap 312 will be urged toward the pressure plate 58 to fluidly seal the first spring chamber 62 with respect to the second spring chamber 63 (FIG. 10).

Figure 12:
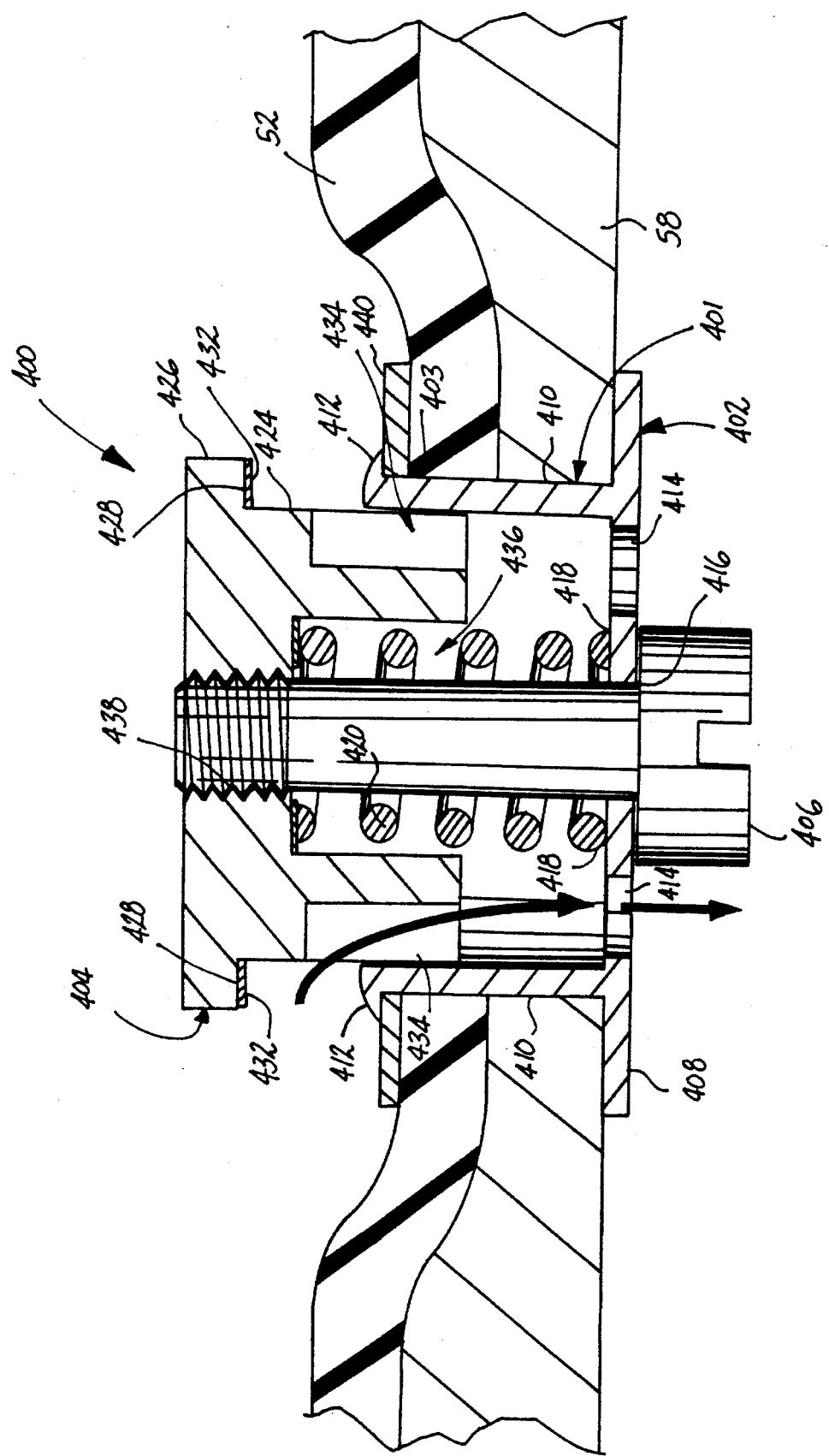
FIG. 12 is a cross-sectional view of a fourth embodiment of a check valve according to the invention.

FIG. 12 illustrates a fourth embodiment of the check valve according to the invention wherein like numerals will be used to describe like parts. The fourth embodiment of the check valve according to the invention utilizes the same components for the spring brake previously identified as numeral 10 through 82.

A check valve 400 mounts within the aligned openings 401 and 403 of the pressure plate 58 and spring brake diaphragm 52, respectively. The check valve 400 comprises a snap ring 402 in which is slidably received a biased plunger 404, which is retained to the snap ring 402 by a fastener 406.

The snap ring 402 comprises a base 408 from which extends sidewall 410, which terminates in an outwardly extending lip 412. Spring chamber apertures 414 are disposed in the base 408 of the snap ring 402 within the sidewall 410. A fastener aperture 416 is centrally disposed in the base 408 and receives the fastener 406. A groove 418 encircles the fastener aperture 416 and is disposed interiorly of the spring chamber apertures 414. The groove 418 receives a portion of a coil spring 420 to retain the coil spring 420 in a predetermined position.

The plunger 404 comprises a body 424 whose shape conforms to the opening defined by the sidewall 410 of the snap ring 402. Integrally formed with the body is a rim 426, which extends beyond the periphery of the body 424 to define a surface 428 to which is mounted an elastomeric sealing material 432. The body 424 further comprises axial slots 434, preferably corresponding in cross sectional area to the spring chamber apertures 414. The body 424 further comprises an interior recess 436, terminating in a tapped aperture 438. The recess 436 receives the other portion of the spring 420 and the tapped aperture 438 receives the threaded end of the fastener 406.

To assemble the check valve 400, the snap ring 402 is inserted through the aligned openings 401 and 403 so that the base 408 rests against the upper surface of the pressure plate 58 and the lip 412 extending from sidewall 410 is disposed above or in contact with the diaphragm 52. Preferably, a washer 440 is placed between the lip 412 of the snap ring 402 and the diaphragm 52 to provide a seal between the diaphragm 52, the sidewall 410 and the pressure plate 58. The lower portion of the spring 420 is mounted within the groove 418 in the base 408 of the snap ring 402 to retain the spring 420 to the base 408. The body 424 of the plunger 404 is inserted into the aperture defined by the sidewalls 410 of the snap ring 402 so that the upper portion of the spring is received within the recess 436 of the body 424. The fastener 406 is inserted through the fastener aperture 416 of the snap ring base 408 and threaded into the tapped aperture 438 of the body 424 to movably retain the plunger 404 to the snap ring 402.

In operation, the plunger 404 is generally biased away from the snap ring 402 by the coil spring 420. The fastener 406 is sufficiently long so that the axial slots 434 extend above the lip 412 on the sidewall 410 of the snap ring 402 to fluidly connect the second spring chamber 63 with the first spring chamber 62 by providing for the passage of fluid through the axial slots 434 and their corresponding spring chamber apertures 414. As the pressure differential is increased, the force caused by the pressure on the plunger 404 overcomes the spring force of the coil spring 420 and the body 424 of the plunger 404 is moved into the opening defined by the sidewall 410 of the snap ring 402 until the elastomeric seal 432 contacts the lip 412 of the sidewall 410 to seal the first spring chamber 62 with respect to the second spring chamber 63. As the plunger 404 is forced into the recess formed by the sidewall 410 of the snap ring 402, the sidewall 410 block the axial slots 434 to inhibit the flow of air into the first spring chamber 62 from the second spring chamber 63. When the axial slots 434 are blocked, the pressure differential increases greatly causing the plunger to close convincingly and prevent the possible valve chatter. The flow of air is completely inhibited when the elastomeric seal 432 contact the sidewalls 410 of the snap ring 402.

Figure 13:
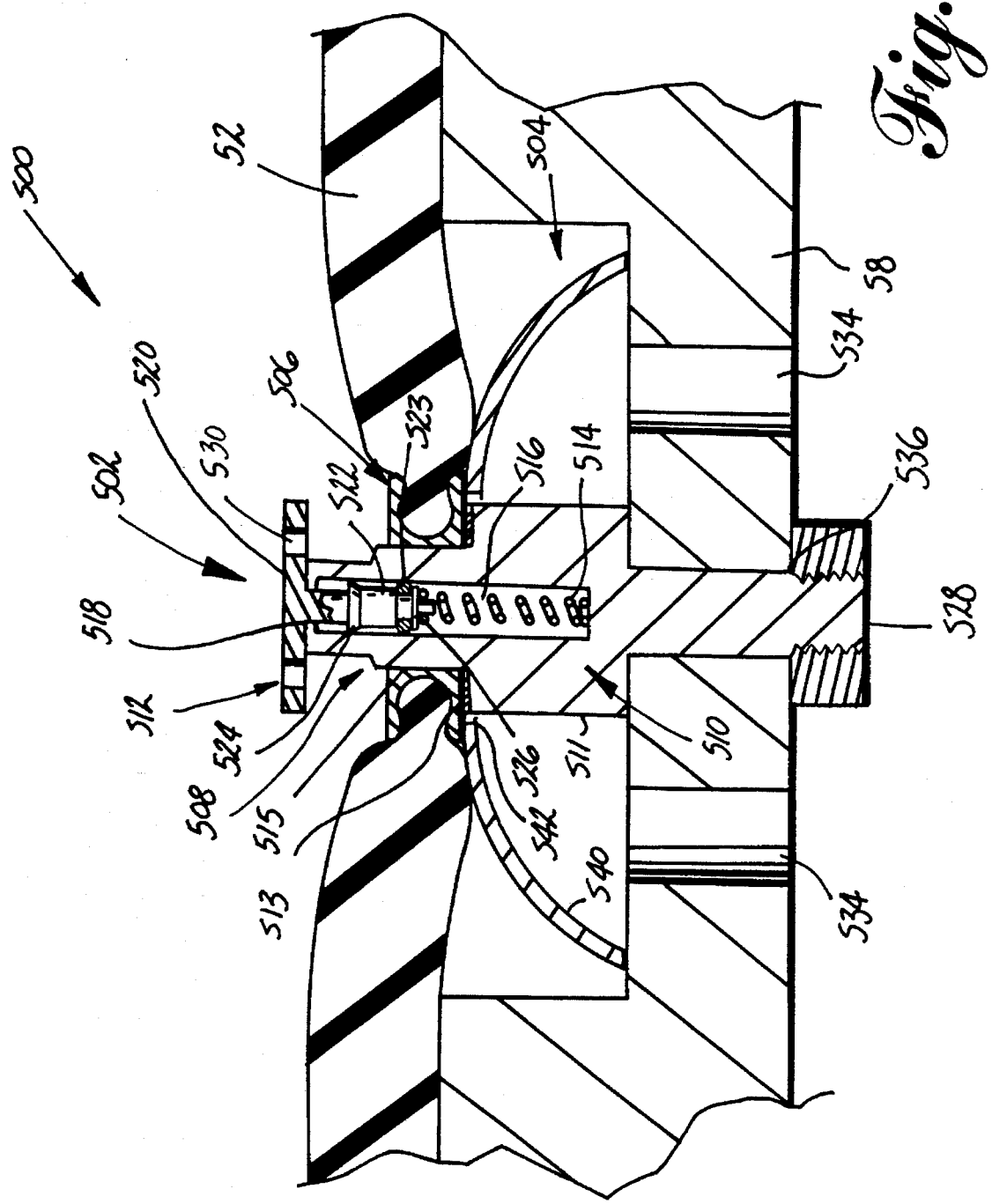
FIG. 13 is a sectional view of a fifth embodiment of a check valve according to the invention.
Figure 14:
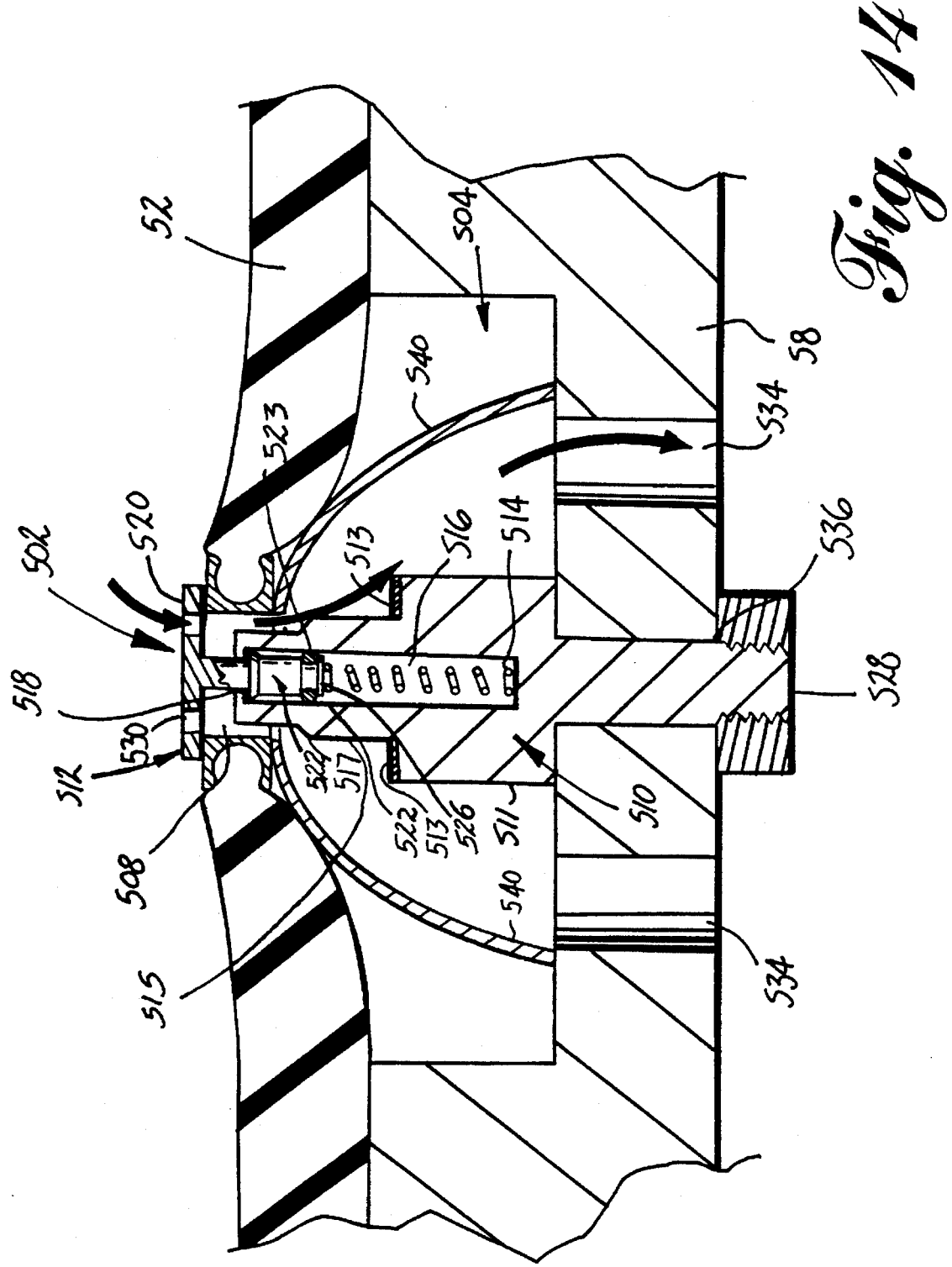
FIG. 14 is a view like FIG. 13 but showing the check valve of the fifth embodiment in the open position.

FIGS. 13 and 14 illustrate a fifth embodiment of the check valve according to the invention wherein like numerals will be used to describe like parts. The fifth embodiment of the check valve according to the invention utilizes the same components for the spring brake previously identified as numerals 10 through 82.

A check valve 500 comprises a plunger assembly 502 mounted within a recess 504 formed in the pressure plate 58. The plunger assembly extends through an aperture 508 of a grommet 506 for the elastomeric diaphragm 52.

The plunger assembly 502 comprises a stepped base 510, a plunger 512 and a coil spring 514. The stepped base 510 has sides 511 terminating in a step 513. A second side 515 extends upwardly from the step 513 and has a shoulder 517 between the step 513 and an inwardly extending flange 518. The base 510 has an interior opening 516 partially closed at an upper portion by the inwardly extending flange 518. The coil spring 514 is mounted within the interior opening 516. The plunger 512 comprises a plate 520 from which extends a shaft 522 that is mounted within the interior opening 516. The shaft 522 has an enlarged diameter portion 524 with a groove 526 in which one end of the coil spring 514 is received to fix the coil spring with respect to the shaft 522. A seal 523, such as an O-ring, is mounted to the shaft 522 and seals the shaft 522 with respect to the interior opening 516. Further, the enlarged diameter portion 524 of the shaft 522 will contact the inwardly extending flange 518 to prevent the removal of the plunger 512 from the base 510. The base 510 further comprises a threaded stem 528 extending from the bottom of the base 510. The plate 520 of the plunger 512 has plate apertures 530 passing through the plate 520.

The pressure plate 58 further comprises spring chamber apertures 534 that extend through the pressure plate 58 and into the recess 504. A base aperture 536 extends through the pressure plate 58 and receives the threaded stem 528 of the base 510.

A disk spring 540 is disposed within the recess 504 and has a centrally disposed aperture 542 through which the base 510 passes. The grommet 506 of the spring brake diaphragm 52 rides on the disk spring 540.

In operation, the disk spring 540 biases the grommet 506 and the spring brake diaphragm 52 upwardly so that the grommet 506 contacts the underside of the plate 520 of the plunger 512 and the coil spring 514 urges the enlarged diameter portion 524 of the shaft 522 for the plunger 512 upwardly into contact with the inwardly extending flange 518 of the base 510 (FIG. 14). In this position, the second spring brake chamber 63 is fluidly connected to the first spring brake chamber 62 because fluid can flow through the plate apertures 530 into the recess 504 and through spring chamber apertures 534 to the first spring brake chamber 62.

However, as the pressure differential is increased, the force caused by the pressure differential forces the plunger 512 downwardly against the force of the coil spring 514. As the plunger is forced downwardly, it contacts the grommet 506 and urges the grommet downwardly. When the grommet reaches the shoulder 517 of the base 510, the flow of fluid between the first spring chamber and the second spring chamber 63 is substantially reduced, thereby increasing the pressure differential and its resultant force between the first spring brake actuator chamber 62 and the second spring brake actuator chamber 63. The resultant increase in the force caused by the pressure differential forces the spring brake diaphragm 52 downwardly against the force of the disk spring 540, until the grommet 506 contacts the step 513 of the base 510 to completely seal the first spring brake actuator chamber from the second spring brake actuator chamber.

Figure 15:
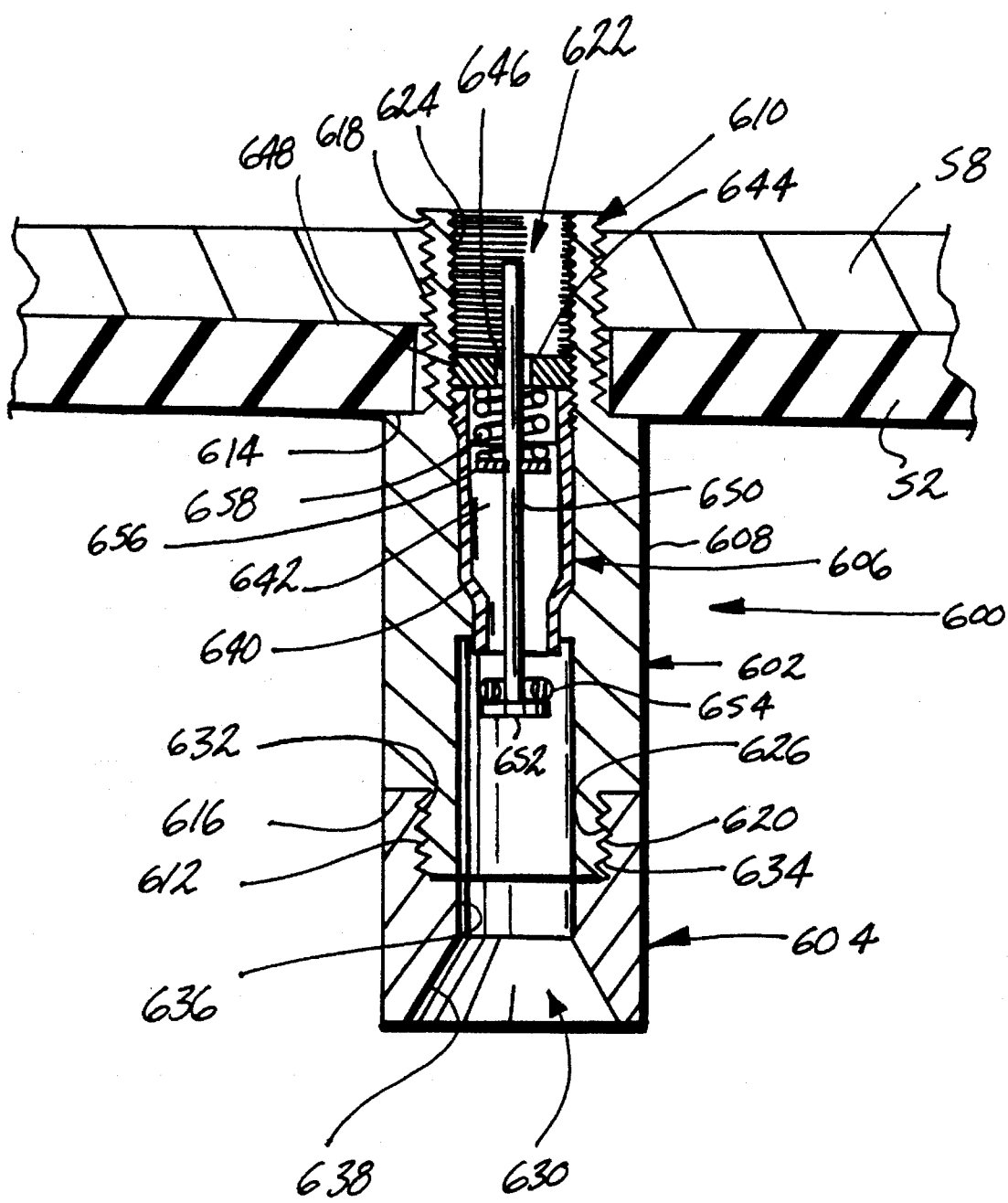
FIG. 15 is a cross-sectional view of a sixth embodiment of a check valve according to the invention.

FIG. 15 illustrates a sixth embodiment of the check valve and utilizes the same components for the spring brake previously identified as numerals 10 through 82. The sixth embodiment of the check valve is a valve 600, which comprises a mounting member 602, and a nozzle 604 mounted to the end of the mounting member 602 and a valve casing 606 mounted within the interior of the mounting member 602. The mounting member 602 comprises a body portion 608 from which extend threaded ends 610 and 612 on opposite sides of the body 608. The threaded ends 610 and 612 are smaller in circumference than the body 608 and define walls 614 and 616, respectively, which are parallel to the pressure plate 58 and the elastomeric diaphragm 52. The threaded ends 610 and 612 have screw threads 618 and 620, respectively, on the exterior portion thereof. The mounting member 602 further has an axial aperture 622 passing axially through the mounting member. The interior of the threaded end 610 has screw threads 624 within the aperture 622.

The nozzle 604 is complementary in shape to the mounting member 602 and has an aperture 630 extending axially through the inlet member. The aperture 630 comprises a recess portion 632 with screw threads 634 disposed on the inner surface of the recess portion of the aperture 630. The recess 632 is adjacent a constant diameter orifice 636. The constant diameter orifice 636 is adjacent a varying diameter opening 638. The nozzle 604 is threadably mounted to the mounting member 602 by screwing the nozzle 604 onto the threaded end 612 of the mounting member 602.

The valve casing 606 comprises a tubular outer wall 640, which defines an axial aperture 642. One end of the axial aperture 642 is partially closed by a plate 644 having a guide aperture 646. The plate is fixedly mounted to the outer wall 640 of the valve casing 606 and has threads 648 on the exterior thereof which are threadably received by the internal thread 624 of the mounting member 602. An elongated shaft 650 extends through the guide aperture 646 and the axial aperture 642 of the valve casing 606. The end of the elongated shaft 650 opposite the plate 644 has a cap 652 to which is mounted an elastomeric sealing member 654. A spring plate 656 is centrally fixed to the elongated shaft 650 and is adapted to mount a coil spring 658, which is mounted between the spring plate 656 and the plate 644. In an unloaded position, the coil spring 658 urges the cap 652 and elastomeric sealing member 654 away from and out of contact with the outer wall 640 of the valve casing 606.

In operation, the first spring chamber 62 and second spring chamber 63 are fluidly connected by the valve 600 because fluid can pass through the axial aperture 622 of the mounting member 602, the axial aperture 642 of the valve casing 606 and the axial aperture 630 of the nozzle 604 when the force caused of the pressure differential between the first spring chamber 62 and the second spring chamber 63 is less than the force of the coil spring 658 so that the cap 652 and the elastomeric sealing member 654 do not close the axial aperture 642 of the valve with respect to the axial aperture 622 of the mounting member and the axial aperture 630 of the nozzle 604. As the pressure differential between the first spring chamber 62 and the second spring chamber 63 is increased, the force acting on the cap 652 overcomes the spring force of the coil spring 658 and urges the cap 652 and elastomeric sealing member 654 into contact with the outer wall 640 of the valve casing 606 to prohibit the flow of fluid through the aligned axial apertures 622, 642 and 630.

Figure 16:
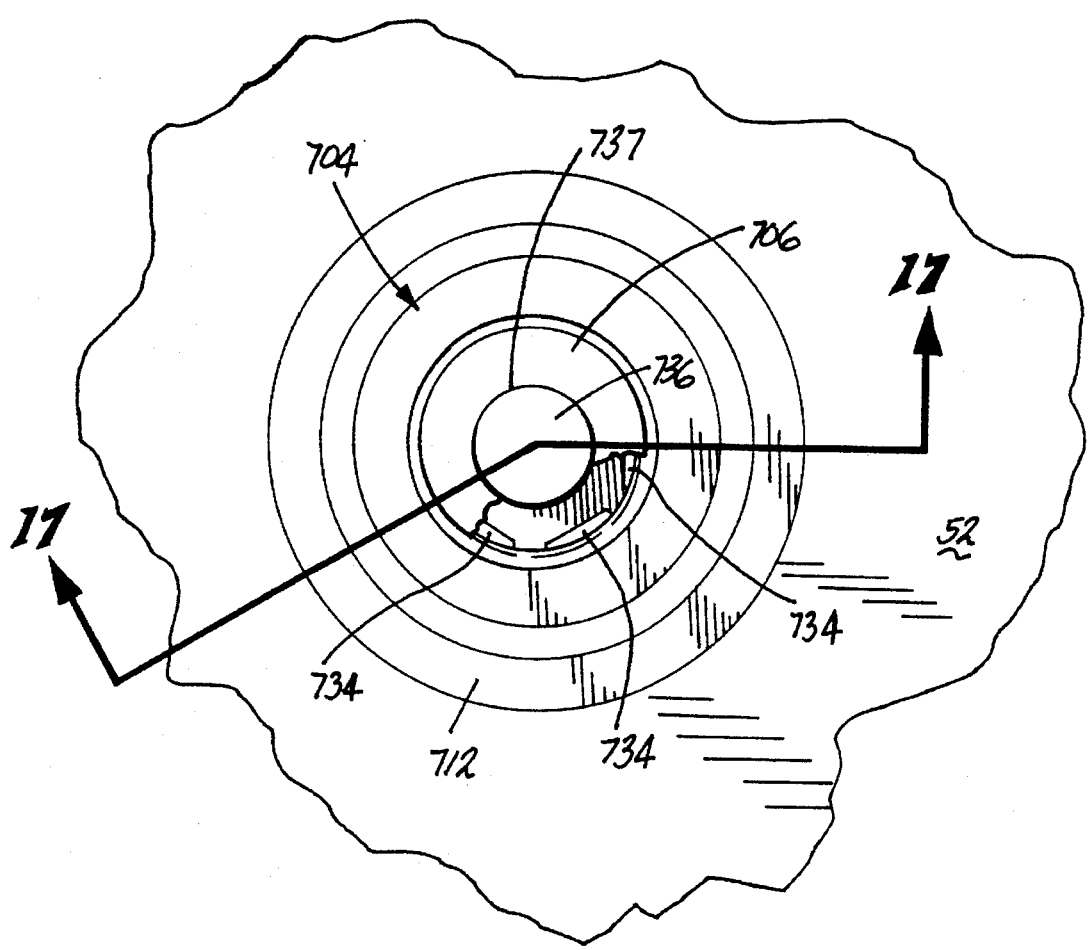
FIG. 16 is a plan view of a seventh embodiment of a check valve according to the invention.
Figure 17:
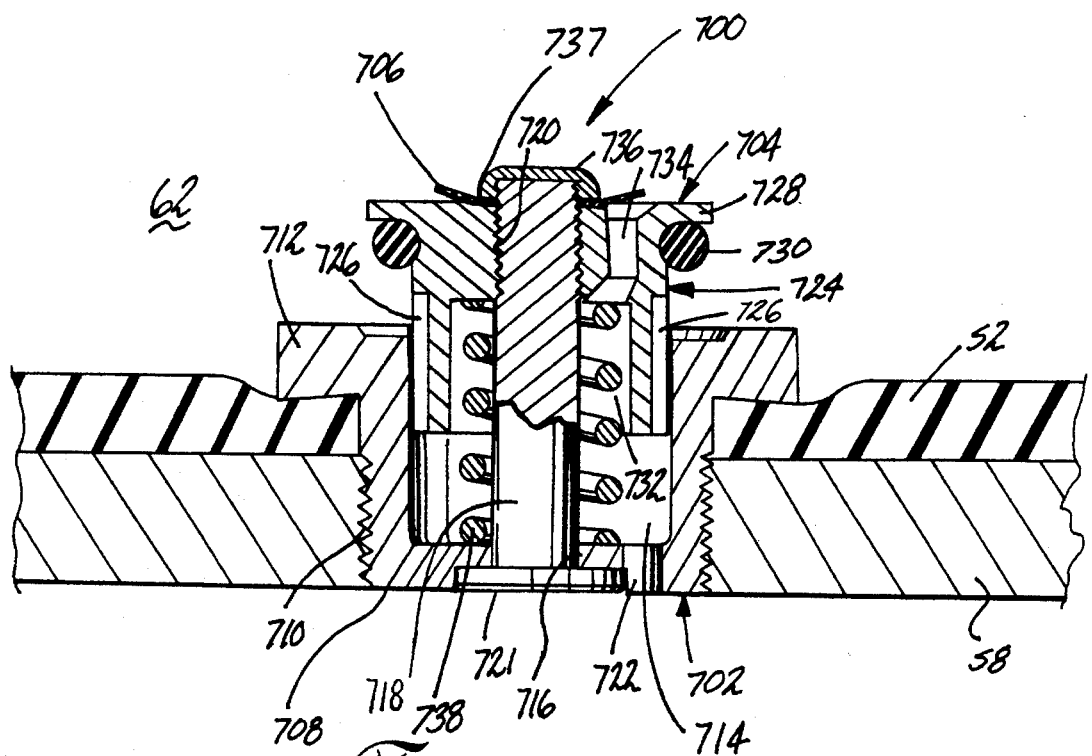
FIG. 17 is a cross sectional view taken along lines 17—17 of FIG. 16 and showing the check valve in the open position.
Figure 18:
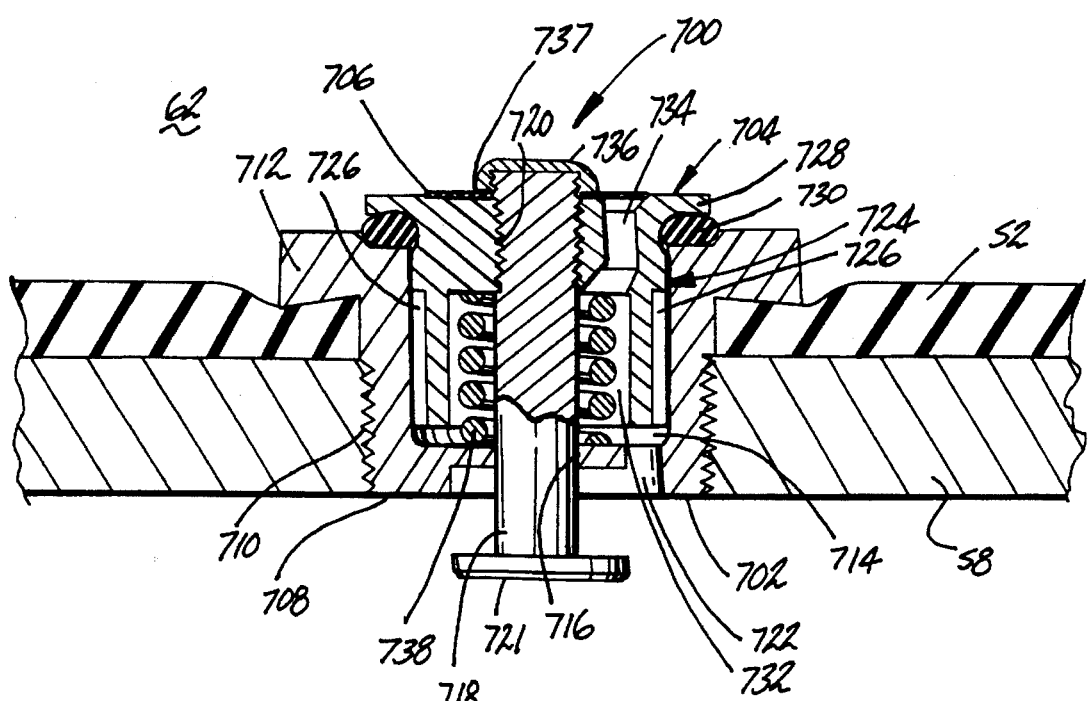
FIG. 18 is a view like FIG. 17 but showing the check valve of the seventh embodiment in the closed position.

FIGS. 16 through 17 illustrate a seventh embodiment of the check valve which utilizes the same components for the spring brake previously identified as numerals 10 through 82. The seventh embodiment of the check valve is a two-stage vane 700, which comprises a threaded connector 702, threadably connected to the pressure plate 58 and slidably receiving a poppet 704 having a poppet flap 706. The threaded connector 702 comprises a tubular connector body 708 with external threads 710 and from which extends an annular connector rim 712. The tubular threaded connector 702 defines a recess 714 in which is received the popper 704. The threaded connector 702 is threadably connected to the pressure plate 58 so that the connector rim 712 compresses the spring brake diaphragm 52 against the pressure plate 58.

The bottom portion of the connector body 708 has a centrally disposed aperture 716 through which is received a bolt 718 with threads 720 at one end and head 721 at the other end. Multiple fluid apertures 722 connect the recess 714 with the first spring brake chamber 62 and are circumferentially spaced about the central aperture 716. One end of spring 738 abuts the lower wall of the connector body 708 between the central aperture 716 and the fluid apertures 722.

The poppet 704 comprises a cylindrical body 724 with multiple slots 726 disposed about the periphery of the poppet body 724. The upper portion of the poppet body 724 has a poppet rim 728 below which is disposed an elastomeric seal 730 such as an O-ring. A recess 732 is formed in the poppet body 724 and communicates with the second spring brake actuator chamber 63 by multiple passages 734 extending from the recess through the rim 728 of the poppet 704. The poppet recess 732 is also fluidly connected to the connector body recess 714.

The poppet flap 706 is mounted to the poppet 704 by the bolt 718 and cap 736. The poppet flap 706 is mounted over the threads 720 of the bolt 718 and the cap 736 is threaded onto the thread 720 to secure the poppet flap 706 to the poppet 704. The poppet flap 706 is positioned so that it can cover the passages 734. The poppet flap 706 has a flexible joint 737 so that the periphery of the poppet flap 706 naturally extends away from the passages 734 wherein the passages 734 are not blocked by the poppet flap 706 when the check valve is in the open position as illustrated in FIG. 16.

A spring 738 is mounted within the recess 714 of the connector body 708 and extends into the recess 732 of the poppet 704 to bias the poppet out of the recess 714 of the threaded connector 702. However, the axial travel of the poppet is limited by the length of the bolt 718. The spring 738 biases the poppet 704 away from the connector 702 until the head 721 contacts the connector 702.

In operation, the check valve 700 operates in two stages. Initially, the check valve is in the open position as illustrated in FIG. 17. As the second spring brake actuator chamber 63 is filled with pressurized fluid, the fluid travels from the second spring chamber 63 to the first spring chamber 62 by entering the passages 734 and the end slots 726 of the poppet 704 and exiting the fluid passages 722 of the connector 702. Once the pressure differential between the second spring brake actuator chamber 63 and the first spring brake actuator chamber 62 reaches a predetermined level, the poppet flap 706 pivots about the flexible joint 737 to seal the passages 734 and the check valve 700 enters the second stage. In the second stage, the pressure drop across the check valve 700 greatly increases because the area through which the fluid flows is greatly reduced when the poppet flap 706 seals the passages 734. When the area through which the fluid flows between the first spring chamber 62 and the second spring chamber 63 is reduced, there is a corresponding increase in the pressure acting on the poppet. The increased force caused by the pressure differential overcomes the spring 738 and urges the poppet 704 into the recess 714 of the connector 702 until the poppet lip 704 and the elastomeric seal 730 contact the connector lip 712. In this position, the first spring brake actuator chamber is fluidly sealed with respect to the second spring brake actuator chamber because the slots 726 are disposed completely within the recess 714 of the connector 702 so that no fluid can move through the slots 726 from the first spring brake actuator chamber 62 to the second spring brake actuator chamber 63.

Upon the exhaustion of the pressurized air from the second spring brake actuator chamber 63, the spring 738 biases the poppet 704 away from the connector 702 to expose the slots 726 to the second spring chamber 63 and the inherent resiliency of the poppet flap 706 urges the poppet flap 706 away from the passages 734 to fluidly open the passages 734, providing a greater area through which fluid can flow to equalize the pressure between the first spring brake actuator chamber 62 and the second spring brake actuator chamber 63 so that any vacuum that may form in the first spring brake actuator chamber 62 is quickly eliminated or prohibited by the increased flow of fluid through the passages 734 and slots 726 of the poppet 704.

The benefits of the two-stage check valve 700 are that the poppet flap 706, when closed, reduces the cross sectional area available for fluid flow during the pressurization of the second spring brake actuator chamber 63 so that the sealing of the first spring brake actuator chamber 62 with respect to the second spring brake actuator chamber 63 is quickly achieved during pressurization. However, the two-stage check valve 700 also provides for an increased area through which fluid can flow during the exhaustion of the pressurized air from the second spring brake actuator chamber 63 so that a greater quantity of fluid can flow from the second spring brake actuator chamber 63 into the first spring brake actuator chamber 62 to reduce or eliminate any vacuum that may form in the first spring brake actuator chamber 62, which would otherwise affect the reaction time of the spring brake.

Reasonable variation and modification are possible within the scope of the foregoing disclosure without departing from the spirit of the invention which is defined in the accompanying claims. For instance, the invention is not limited to the one-way vent 82 described herein, and other means, such as a flap vane, may be provided which pass air from the first spring chamber 62 to atmosphere and block air flow from the operating environment into the first spring chamber. Also, a check valve can be used in the service chamber. The spring arm 112 can be mounted in either the first or second chamber of either the spring or service chamber. Furthermore, the check valve of the invention can be used in a fluid-brake not having a tandem mounted spring and service chamber.

The embodiments of the invention in which an exclusive property or privilege is claimed are defined as follows:

1. In a brake actuator for a vehicle comprising:

a housing, a movable member disposed within the housing, the movable member dividing the interior of the housing into a first chamber and a second chamber and reciprocally movable therein in response to the delivery and exhaust of pressurized fluid to and from the first chamber, respectively, an actuator rod operably connected to the movable member and movable therewith for operation of a brake, and a spring disposed in the second chamber in a position to urge the movable member to a first position wherein the first chamber is collapsed upon exhaust of pressurized fluid from the first chamber, the improvement comprising:

the movable member having an aperture extending therethrough wherein the first chamber is in communication with the second chamber and a check valve mounted to the movable member in a position to control the flow of fluid through the aperture wherein fluid flow is permitted by the check valve through the aperture as the movable member moves toward the first position and fluid flow through the aperture is inhibited by the valve as the movable member moves away from the first position.

2. In a brake actuator according to claim 1 wherein the check valve comprises an arm movably mounted to the movable member adjacent to the aperture for movement between a sealed position where the arm closes the aperture and an unsealed position where it is disposed away from the aperture.

3. In a brake actuator according to claim 2 wherein the arm is mounted within the first chamber.

4. In a brake actuator according to claim 3 wherein the arm has an elastomeric plug adapted to close off and seal the aperture when the arm is in the sealed position.

5. In a brake actuator according to claim 4 wherein the arm is an elongated spring plate.

6. In a brake actuator according to claim 2 wherein the arm is mounted within the second chamber.

7. In a brake actuator according to claim 6 wherein the arm has an elastomeric plug adapted to close off and seal the aperture when the arm is in the sealed position.

8. In a brake actuator according to claim 7 wherein the arm is an elongated spring plate.

9. In a brake actuator according to claim 1 wherein the check valve comprises a flap disposed in overlying relationship to the aperture in the movable member for movement between a sealed position where the flap closes the aperture and an unsealed position where the aperture is open.

10. In a brake actuator according to claim 9 wherein the flap is biased by a spring.

11. In a brake actuator according to claim 10 wherein the movable member comprises an elastomeric diaphragm and a pressure plate and the flap is formed from the elastomeric diaphragm.

12. In a brake actuator according to claim 11 wherein the spring is a two-arm spring with one arm abutting the elastomeric diaphragm and the other arm abutting the pressure plate.

13. In a brake actuator according to claim 12 wherein the flap is formed by an arcuate cut in the elastomeric diaphragm.

14. In a brake actuator according to claim 11 wherein the spring is a disk spring abutting the pressure plate and the elastomeric diaphragm.

15. In a brake actuator according to claim 14 wherein the flap is formed from the two spaced slits in the elastomeric diaphragm.

16. In a brake actuator according to claim 1 wherein the check valve comprises a guide member mounted within the aperture, said guide member having a guide aperture, and a plunger slidably received within the guide aperture for reciprocal movement with respect to the guide member between a sealed position and an unsealed position.

17. In a brake actuator according to claim 16 wherein the plunger has at least one slot extending axially wherein the slot is exposed relative to the guide member when the plunger is in the unsealed position.

18. In a brake actuator according to claim 17 wherein the guide member has a base, a sidewall extending from the base and a flange, with the flange disposed on one side of the movable member and the base on the other side of the movable member to secure the guide member to the movable member.

19. In a brake actuator according to claim 18 wherein the plunger is biased by a spring mounted between the guide member and the plunger.

20. In a brake actuator according to claim 19 wherein the plunger further comprises an annular flange and an elastomeric sealing member mounted to the flange to seal the plunger with respect to the guide member when the plunger is in the sealing position.

21. In a brake actuator according to claim 16 wherein the plunger is an elongated rod having a cap at one end and the cap abuts the guide member to seal the plunger with respect to the guide member when the plunger is in the sealed position.

22. In a brake actuator according to claim 21 wherein the plunger further comprises a plate disposed on the shaft between the other end of the shaft and the cap and one end of a spring is fixedly mounted to the plate and the other end of the spring is mounted to the flange to bias the plunger to the unsealed position.

23. In a brake actuator according to claim 22 wherein the cap has an elastomeric sealing member disposed on the cap adjacent the guide member to enhance the seal between the plunger and the guide member when the plunger is in the sealed position.

24. In a brake actuator according to claim 16 wherein the plunger further comprises an aperture fluidly connected to the guide member aperture to fluidly connect the first chamber and the second chamber and a moveable flap positioned to seal and unseal the plunger aperture in response to the addition and exhausting of pressurized air from the second chamber.

25. In a brake actuator for a vehicle comprising:

a housing comprising a spring brake actuator housing and a service brake actuator housing;

the spring brake actuator housing having a first movable member disposed within the spring brake actuator housing, dividing the interior thereof into a first spring brake actuator chamber and a second spring brake actuator chamber and reciprocally movable therein in response to the delivery and exhaust of pressurized fluid to the second spring brake chamber;

the service brake actuator housing having a second movable member disposed within the service brake actuator housing, dividing the interior thereof into a first service brake actuator chamber and a second service brake actuator chamber and reciprocally movable therein in response to the delivery and exhaust of pressurized fluid to the first service brake chamber;

an actuator rod operably connected to the first movable member and movable therewith for reciprocation between the spring brake actuator housing and the service brake actuator housing for operation of a brake; and a spring disposed in the first spring brake chamber in a position to urge the movable member to a first position wherein the second spring brake actuator chamber is collapsed upon exhaust of pressurized fluid from the second spring brake actuator chamber, the improvement comprising:

the first movable member having an aperture extending therethrough wherein the first spring brake actuator chamber is in communication with the second spring brake actuator chamber, and a check valve mounted to the movable member in a position to control the flow of fluid through the aperture wherein fluid flow is permitted by the check valve as the movable member moves toward the first position and fluid flow is inhibited by the valve as the movable member moves away from the first position.

26. In a brake actuator for a vehicle comprising:

a housing, dividing means disposed within the housing for dividing the interior thereof into a first chamber and a second chamber, the dividing means being reciprocally movable therein in response to the delivery and exhaust of pressurized fluid to the first chamber, actuating means operably connected to the dividing means and movable therewith for actuation of a brake; and biasing means disposed in the first chamber in a position to urge the dividing means to a first position wherein the second chamber is collapsed upon exhaust of pressurized fluid from the second chamber, the improvement comprising:

the dividing means having an aperture extending therethrough wherein the first chamber is in communication with the second chamber and a fluid flow control means mounted to the dividing means in a position to control the flow of fluid through the aperture wherein fluid flow is permitted by the fluid flow control means as the dividing means moves toward the first position and fluid flow is inhibited by the fluid flow control means as the dividing means moves away from the first position.

27. In a brake actuator for a vehicle comprising:

a housing with an actuator rod opening at one end portion and a vent opening at another end portion, the vent opening defined by an edge of the housing;

a movable member disposed within the housing, the movable member dividing the interior of the housing into a first chamber including the one end portion and a second chamber including the other end portion and reciprocally movable therein in response to the delivery and exhaust of pressurized fluid to and from the second chamber, respectively;

an actuator rod operably connected to the movable member and movable therewith for operation of a brake, the actuator rod projecting through the actuator rod opening in the one end portion;

a spring disposed in the first chamber in a position to urge the movable member to a first position wherein the second chamber is collapsed upon exhaust of pressurized fluid from the second chamber;

a passage between the first and second chambers to pass fluid between the two; and a one-way valve in the passage between the first and second chamber to permit fluid to flow from the first chamber to the second chamber but prevent fluid from flowing from the second chamber to the first chamber;

the improvement comprising:

a check valve mounted in the vent opening in the other end portion of the housing to vent fluid in the second chamber when pressurized fluid is supplied to the first chamber to move the movable member toward the other end of the housing to collapse the spring.

* * * * *